United States Patent Office 3,256,307
Patented June 14, 1966

3,256,307
MANUFACTURE OF ALKYL ALUMINUM SESQUIHALIDES
Jesse R. Mangham, Baton Rouge, La., assignor to Ethyl Corporation, New York, N.Y., a corporation of Virginia
No Drawing. Filed Oct. 31, 1960, Ser. No. 65,906
5 Claims. (Cl. 260—448)

This invention relates to the manufacture of alkyl aluminum halides. More particularly, the invention relates to a new and improved process for producing alkyl aluminum sesquihalides wherein the alkyl group contains four or more carbon atoms, and the halogen is chlorine or bromine.

The alkyl aluminum sesquihalides are a recognized group of chemicals, having the composition represented by the expression, $R_3Al_2X_3$, wherein R is an alkyl group, and X is a halogen. The alkyl aluminum sesquihalides have recognized utility as components of catalysts for the polymerization of olefins, or as starting materials for the formation of trialkyl aluminum compounds, these latter materials being well established or known as polymerization catalysts, reducing agents, or as reactants for the manufacture of other organometallic compounds.

As a practical matter, the only significant alkyl aluminum sesquihalides, heretofore produced, have been the methyl aluminum sesquibromide, $(CH_3)_3Al_2Br_3$ and ethyl aluminum sesquichloride, $(C_2H_5)_3Al_2Cl_3$, or ethyl aluminum sesquibromide, $(C_2H_5)_3Al_2Br_3$.

The materials have been produced by the reaction of subdivided aluminum metal with the corresponding alkyl halides, and this process is readily conducted for making the ethyl aluminum sesquichloride, or the other above mentioned lower alkyl sesquihalides. However, attempts to apply this generic reaction to the manufacture of alkyl sesquihalides, wherein the alkyl group has four or more carbon atoms, have encountered numerous serious difficulties which have prevented commercial utilization of the indicated reaction. Thus, in reacting normal butyl chloride, or isobutyl chloride, with subdivided aluminum, a substantial and large amount of the butyl chloride which does react is degraded to the corresponding alkane hydrocarbon, butane or isobutane. Accordingly, alkyl aluminum sesquihalides with four or more carbon atoms in the alkyl groups, have not been available. A need thus has existed for an efficient and economical process for the production of alkyl aluminum sesquihalides of the type wherein the alkyl group has, typically, four, five or six carbon atoms therein.

The object of the present invention is to provide a new and improved process for the manufacture of alkyl aluminum sesquihalides wherein the alkyl radical is an alkyl group of at least four carbon atoms, and the halogen is selected from the group consisting of chlorine and bromine. A further more specific object of the present invention is to provide a process of the above category wherein the formation of by-product hydrocarbons is drastically suppressed and minimized, and the reaction to produce the desired alkyl aluminum sesquihalide is conducted rapidly effectively and with good yields.

In its most general form the invention of the present process comprises feeding a primary alkyl halide into reactive contact with subdivided aluminum metal, and reacting at moderately elevated temperatures. The reaction is also conducted in the presence of an accompanying quantity of an alkyl aluminum compound, having at least two alkyl groups per atom of aluminum. The alkyl aluminum additive can be employed in widely varying proportions according to factors discussed hereinbelow, but is, generally provided in proportions of from at least about 1 to about 15 mole percent, and preferably, 3 to 5 based upon the alkyl halide employed as a reactant. In conducting the reaction, the subdivided aluminum metal can be suspended or agitated in an inert hydrocarbon solvent, or, alternatively, in a partial product mixture from a previous cycle. The desired alkyl halide is introduced to this solid-liquid mixture, usually concurrently with the trialkyl aluminum. The mixture is maintained at reaction conditions which normally are in the range of about 40 to 90° C., a preferred temperature range being from about 50 to 80° C.

In carrying out the reaction, various manipulative techniques are suitable. For example, a batch type operation is frequently employed, wherein the alkyl halide is fed to the reaction zone over a finite period, and then an additional reaction time is provided for substantial completion of the reaction. Another mode of operation involves cyclic operation, in which the feed of alkyl halide and trialkyl aluminum additive is discontinued after a finite period, and agitation of the reaction mixture is terminated. The solids are then allowed to settle and a portion of liquid phase is withdrawn for recovery of the desired product. The next cycle is initiated by adding additional aluminum and initiating the succeeding reaction by feed of the alkyl halide and of the additional trialkyl aluminum additive and initiation of reaction conditions. This technique has the particular virtue of providing a liquid reaction medium for the subdivided aluminum particles, rather than requiring the provision of an inert hydrocarbon medium at the beginning of each cycle.

In virtually all forms of the process a residence time of from about 30 minutes to about 90 minutes is suitable, although this operating variable is not thus limited.

The liquid phase portion delivered from the reaction zone after completion of a batch, or of a cycle, is usually of such purity that no significant additional treatment is required. In other instances, however, minor quantities of the more finely subdivided aluminum solids accompany this effluent and are desirably removed by conventional solids-liquids separation methods.

The aluminum reactant employed can appear in a variety of physical forms, and in various degrees of chemical purity. It is found that commercially available subdivided aluminum is highly effective for the process, and in addition, when this feed material is provided, the beneficial effect of the trialkyl aluminum additive is most significant. On the other hand, when the aluminum has been pretreated or activated by known means, the trialkyl additive employed in the process is nevertheless significantly beneficial.

The details of operations and of the best manner and modes of performing the invention will be readily understood from the working examples given hereinafter.

*Example I*

In this operation a supply of commercially available subdivided aluminum was mixed in a reaction vessel with a dry solvent consisting of 2,2,5-trimethyl hexane. In addition, triethyl aluminum was charged in proportions of 3 mole percent of the n-butyl bromide subsequently fed. The aluminum powder had been prepared by atomizing molten material. Such supplies are obtainable from the Metals Disintegrating Co., or other sources. The solvent was provided in proportions of about 43 mls. per 10 grams of aluminum. The mixture was agitated and heated to a temperature of about 60° C., and then n-butyl bromide was fed at a slow rate, to control the reaction velocity. Reaction proceeded smoothly, after a short starting delay, and was continued until the n-butyl bromide had been fed in amount equal to 77 percent of the stoichiometric equivalent of the aluminum. Alternatively expressed the aluminum was provided in 30 percent excess. A good yield of the order of 71 percent, of n-butyl sesquibromide was obtained with a total residence time of 90 minutes.

When the foregoing procedure was repeated, except that no triethyl aluminum was provided, the yield was reduced eight percent, and, in addition, an induction period of 30 minutes was experienced before reaction occurred. Further, copious quantities of gases were evolved, including ethane, n-butane, and isobutane.

*Example II*

In this operation, the procedure of Example I is repeated, except that butyl chloride is the alkyl halide employed and tri-n-butyl aluminum is employed in proportions of 5 mole percent of the butyl chloride. A similar growth reaction is obtained, and at the termination of the operation, after a 40 minute reaction cycle, the excess aluminum solids are settled and a clear liquid phase further is withdrawn.

The withdrawn liquid phase is separated by fractionation at atmospheric, or slightly sub-atmospheric pressures, to recover a good yield of butyl aluminum sesquichloride, $(C_4H_9)_3Al_2Cl_3$. The reaction is accompanied, in each of the reacting cyclic phases, by formation of only minute quantities of butane and butylene as decomposition by-products.

*Example III*

The procedure of Example II is repeated, except that in this case isobutyl bromide is employed as the alkyl halide, tri-isobutyl aluminum being charged in proportions of 4 percent of the isobutyl bromide. A good conversion to isobutyl sesquibromide is obtained, with very little formation of hydrocarbon by-products.

The following table illustrates additional examples of embodiments employing the technique and process of the present invention.

substantial amount of unreacted alkyl halide is discharged from the reaction zone, then, upon recycle of such alkyl halide to the reaction zone additional alkyl aluminum compound is provided therewith.

As already indicated, the alkyl aluminum compound is provided in a mole proportion of at least about 1 and up to about 15 mole percent, based upon the alkyl halide being fed to the process. A preferred concentration range is from 3 to 5 mole percent. A highly effective procedure is to provide a stock reactor feed wherein the alkyl aluminum additive is already admixed with the alkyl halide. When the alkyl aluminum compound is itself an alkyl aluminum halide, such as diethyl aluminum chloride, diethyl aluminum bromide, desirably the proportions of this additive are adjusted upwardly in inverse proportion to the number of alkyl groups present in the molecules. Thus, when diethyl aluminum chloride is utilized as the ethyl aluminum compound, the concentration should be approximately 50 percent greater than the concentration of triethyl aluminum, when such is used, to provide an equivalent effect.

It is preferred that an appreciable excess of aluminum metal be provided in the reaction zone, relative to the alkyl halide present at the same time. In the cyclic type of operations illustrated by Examples I and II, for example, the aluminum is provided in an excess of 10 to 50 percent above the stoichiometric requirements for the alkyl halide. In order to most efficiently utilize the total aluminum, as already indicated, the unreacted aluminum is frequently retained in the reaction zone and is supplemented by fresh aluminum added at the same time that an additional alkyl halide is charged.

The temperatures of operation are somewhat variable, and are dependent to some extent upon the identity of the alkyl halides. In the case of n-hexyl chloride, as illustrated in Example IV, and operating temperature of the

| Example | Alkyl halide | Alkyl aluminum compound additive | Aluminum type | Reaction time, Hr. | Operating method | Product |
|---|---|---|---|---|---|---|
| IV | n-Hexyl chloride | Diethyl aluminum chloride, 5 mole percent. | Flakes, 200% excess. | 0.6 | Pass through elongated tube reactor, use nonene solvent. | n-Hexyl aluminum sesquichloride. |
| V | Isoamyl chloride | Tri-isobutyl aluminum, 3 mole percent. | Powder, 40–100 mesh; 25% excess. | 1.2 | Same as Ex. I | Isoamyl aluminum sesquichloride. |
| VI | n-Heptyl bromide | Trioctyl aluminum, 10 mole percent. | Powder, 40–200 mesh, 50% excess. | 0.8 | Same as Ex. I | n-Heptyl aluminum sesquibromide. |

In the foregoing examples, a good conversion of the alkyl halide to the desired alkyl aluminum sesquihalide is obtained in each instance, with only a minor portion of the alkyl halide being consumed by decomposition reactions resulting in formation of gaseous or liquid hydrocarbon by-products.

While the function of the added alkyl aluminum compound is not absolutely clearly understood, it appears that these additives are highly effective repressants of unknown decomposition reactions, at least for finite periods of operating times at operating temperatures. For periods of up to about an hour and a half, and preferably not more than about one hour at operating temperatures, the added alkyl aluminum compound substantially minimizes the decomposition or side reactions. Hence, in all embodiments of the process of the invention, provision is made for control of the residence time at reaction conditions, and for the provision of the alkyl aluminum compound in the desired proportions. The alkyl aluminum compound is preferably added along with the fresh feed of the alkyl halide, but is also comparably effective, in batch operations, when added all in one portion. In those embodiments wherein only a partial conversion of the alkyl halide to the desired aluminum sesquichloride is achieved in one pass or one stage of the reaction, and a order of up to about 80° C. is permissible. In the case of the lower alkyl halides, when employed as reactants, operating temperatures can be appreciably lower. Refluxing conditions can be maintained, for example, when butyl chloride or isobutyl chloride are employed as reactants, or when a relatively volatile hydrocarbon solvent is also used. More frequently, however, the processes of the invention are carried out entirely in liquid phase reactions, in the presence, of course, of the solid aluminum reactant.

As already indicated, a particular feature of the invention is the desirable limitation of the reaction period or average residence time to from about ¼ hr. to 1½ hrs., the preferred reaction time being from one-half to one hour. This limitation does not imply that unreacted alkyl halide following such a typical residence time, is discarded, but instead that upon withdrawing a liquid reaction phase, the unreacted alkyl halide can be recovered by fractional distillation, and returned to the reaction zone, for complete or virtually complete conversion, along with additional quantities of the desired alkyl aluminum compound.

Although inert solvents are not mandatory to obtain the benefits of the process, they frequently are desirable for facilitating the reaction and the separation of the components of the process. Non-aromatic hydrocarbon materials are preferred as the solvents, and these are discharged with the reaction mixture, or with the liquid phase of the reaction mixture, when it is withdrawn. In such instances, a fractional distillation separation is again required to isolate the alkyl aluminum sesquihalides as products.

In numerous instances, the liquid phase initially present at the start of a reaction cycle is primarily a liquid residue or heel from a preceding reaction, no extraneous solvent being provided. In such instances, at the completion of reaction cycles, sufficient liquid is left in the reaction zone to assure that the excess aluminum, plus fresh aluminum to be charged is fully covered by the liquid phase.

Having fully described the process of the invention, what is claimed is:

1. A process for the manufacture of an alkyl aluminum sesquihalide, the alkyl groups thereof having from 4 to 7 carbon atoms and the halogen thereof being selected from the group consisting of chlorine and bromine, said process comprising reacting an alkyl halide and subdivided aluminum, the alkyl halide being selected from the group consisting of n-butyl bromide, n-butyl chloride, isobutyl bromide, isoamyl chloride, and n-heptyl bromide, in the presence of an inert liquid hydrocarbon medium and a trialkyl aluminum compound in the proportions of from about 1 to 15 mole percent of the alkyl halide as the sole additive, said trialkyl aluminum compound being selected from the group consisting of triethyl aluminum, tri-n-butyl aluminum, tri-isobutyl aluminum, and trioctyl aluminum, and heating said so-formed mixture at reaction temperatures for a reaction period of from about ½ to 1½ hours.

2. The process of claim 1 further defined in that the alkyl halide is n-butyl bromide and the trialkyl aluminum compound is triethyl aluminum.

3. The process of claim 1 further defined in that the alkyl halide is n-butyl chloride and the trialkyl aluminum is tri-n-butyl aluminum.

4. The process of claim 1 further defined in that the alkyl halide is isobutyl bromide and the trialkyl aluminum is tri-isobutyl aluminum.

5. The process of claim 1 further defined in that the alkyl halide is n-heptyl bromide and the trialkyl aluminum is trioctyl aluminum.

References Cited by the Examiner

UNITED STATES PATENTS

| | | | |
|---|---|---|---|
| 2,863,894 | 12/1958 | Smith | 260—448 |
| 2,903,469 | 9/1959 | Hawkins et al. | 260—448 |
| 2,987,533 | 6/1961 | King et al. | 260—448 |

TOBIAS E. LEVOW, *Primary Examiner.*